United States Patent [19]
Nakamura et al.

[11] Patent Number: 5,640,653
[45] Date of Patent: Jun. 17, 1997

[54] IMAGE SYNTHESIZING SYSTEM SYNTHESIZING IMAGES BY USING AN INTERMEDIATE TRANSFER BELT

[75] Inventors: Haruka Nakamura, Mishima; Kazutaka Nagata, Tokyo; Kei Sato, Atsugi; Noboru Murayama, Machida, all of Japan

[73] Assignee: Ricoh Company, Ltd., Tokyo, Japan

[21] Appl. No.: 277,633

[22] Filed: Jul. 20, 1994

[30] Foreign Application Priority Data

Jul. 23, 1993 [JP] Japan .................................. 5-202978

[51] Int. Cl.$^6$ .............................................. G03G 15/36
[52] U.S. Cl. .............................................. 399/194
[58] Field of Search ........................... 355/202, 218, 355/272, 275, 327, 326; 399/194

[56] References Cited

U.S. PATENT DOCUMENTS

| | | | |
|---|---|---|---|
| 4,707,126 | 11/1987 | Ohshima et al. | 355/218 X |
| 4,769,675 | 9/1988 | Watanabe | 355/202 |
| 4,896,208 | 1/1990 | Moriya et al. | 358/78 |
| 4,989,042 | 1/1991 | Muramatsu et al. | 355/202 X |
| 5,040,031 | 8/1991 | Hayashi | 355/326 |
| 5,065,181 | 11/1991 | Ito | 355/202 |
| 5,070,372 | 12/1991 | Randall | 355/272 |
| 5,089,559 | 2/1992 | Kusumoto et al. | 355/327 |
| 5,138,392 | 8/1992 | Kinoshita et al. | 355/289 |
| 5,182,599 | 1/1993 | Kinoshita | 355/208 |
| 5,268,717 | 12/1993 | Imaizumi | 355/272 X |
| 5,386,270 | 1/1995 | Housel | 355/202 |

FOREIGN PATENT DOCUMENTS

| | | |
|---|---|---|
| 0312301 | 4/1989 | European Pat. Off. |
| 0369702 | 5/1990 | European Pat. Off. |
| 2550268 | 5/1976 | Germany |
| 3033193 | 3/1981 | Germany |
| 4-83275 | 3/1992 | Japan |

*Primary Examiner*—Robert Beatty
*Attorney, Agent, or Firm*—Woodcock Washburn Kurtz Mackiewicz & Norris LLP

[57] ABSTRACT

An image synthesizing system is provided which uses an intermediate transfer belt on which a plurality of toner images are superimposed. The image synthesizing system is used for an image processing apparatus which forms a toner image on a recording sheet by using an electro-photographic method. The image synthesizing system comprises a photosensitive drum on which the toner image is formed and an intermediate transfer belt which makes contact with the photosensitive drum so that the toner image formed on the photosensitive drum is transferred onto the intermediate transfer belt. A plurality of toner images are formed on the intermediate transfer belt, each of the toner images being formed on the photosensitive drum in accordance with image data obtained from different image data sources, the toner images being transferred onto the intermediate transfer belt one after another. A command ejection mode can be set by an operator in which an additional image will be superimposed on a first superimposed image. In the command ejection mode, the image generation will be begun by a print command and an ejection command will terminate the command ejection mode. Both the print and ejection command are inputted by an operator via a control panel.

28 Claims, 11 Drawing Sheets

IMAGE SYNTHESIZING SYSTEM SYNTHESIZING IMAGES BY USING AN INTERMEDIATE TRANSFER BELT

BACKGROUND OF THE INVENTION

The present invention generally relates to image synthesizing systems, and more particularly to an image synthesizing system comprising an image forming apparatus of an electro-photographic type, the image synthesizing system synthesizing images by using an intermediate transfer belt provided therein.

In a conventional image synthesizing system used in an image processing apparatus such as a copy machine, a plurality of images are synthesized by means of data processing. Such data processing is performed by using a page buffer memory which stores image data corresponding to an entire page of an original. One image datum to be synthesized is first stored in the page buffer memory, and then another image datum to be synthesized is stored in the same page buffer memory, these image data to be synthesized by means of the data processing. The synthesized image may be displayed, if necessary, on a display apparatus so as to confirm whether a desired image has been synthesized. The data of the synthesized image is then supplied to an image forming apparatus so as to output the synthesized image on a recording sheet.

In the above-mentioned image processing for synthesizing the image data, it is previously determined, for an area in which a plurality of images are synthesized, which image is to appear as a basic image and which image is superimposed over the basic image. The image to be superimposed is generally in a blank area of the basic image. When synthesizing two monochromatic images, both images may appear in the same area, that is, one image may overlap the other image.

In recent years, the image processing apparatus has been adapted to handle a multi-color image process and a high-resolution imaging process, and thus capacity of the buffer memory necessary for storing image data has been increased. For example, a memory capacity of 16 megabyte is required for a buffer memory for storing image data of four colors, yellow (Y), magenta (M), cyan (C) and black (K), the image data corresponding to an entire standard A4 size paper. If memory capacity for each image datum to be synthesized is stored in the page buffer memory, the required memory capacity should be further increased. Accordingly, an image forming apparatus using the conventional image synthesizing system is expensive and large in size due to a requirement for a large capacity memory even though RAMs used for memory are highly integrated and a cost thereof has been decreased in recent years.

On the other hand, there is considered an image synthesizing method in which a plurality of toner images are superimposed on a recording sheet by directly transferring those toner images onto the recording sheet one after another. However, this method requires a complex conveying mechanism for conveying the recording sheet to a photoconductive drum after one toner image has been transferred thereto. Additionally, the conveying mechanism becomes more complex in order to achieve accurate positioning of the recording sheet each time the transfer of the toner image is performed. Further, a high quality recording paper is required to eliminate deterioration of the positioning accuracy due to deformation of the recording sheet.

SUMMARY OF THE INVENTION

It is a general object of the present invention to provide an improved and useful image synthesizing system in which the above-mentioned problems are eliminated.

A more specific object of the present invention is to provide an image synthesizing system which uses an intermediate transfer belt on which a plurality of images are superimposed so as to form a synthesized image without performing image data processing for synthesizing image data.

In order to achieve the above-mentioned objects, there is provided according to the present invention an image synthesizing system for an image processing apparatus which forms a toner image on a recording sheet by using an electro-photographic method, the image synthesizing system comprising:

a photosensitive drum on which the toner image is formed;

an intermediate transfer belt which makes contact with the photosensitive drum so that the toner image formed on the photosensitive drum is transferred onto the intermediate transfer belt; and image forming means for forming a plurality of toner images on the intermediate transfer belt, each of the toner images being formed on the photosensitive drum in accordance with image data obtained from different image data sources, the toner images being transferred onto the intermediate transfer belt one after another;

synchronizing means for synchronizing a sending timing of the image data corresponding to each of the image data sources with a moving position of the intermediate transfer belt.

According to the present invention, since the toner images are synthesized together on the intermediate transfer belt, a memory used for synthesizing image data can be eliminated. Additionally, the recording sheet is not required to be subjected to a plurality of transfer processes, which condition results in a simple sheet feeding mechanism. Therefore, an inexpensive and compact image synthesizing system can be realized.

Other objects, features and advantages of the present invention will become more apparent from the following detailed description when read in conjunction with the accompanying drawings.

DETAILED DESCRIPTION OF THE PREFERRED EMBODIMENT

Figure 1:
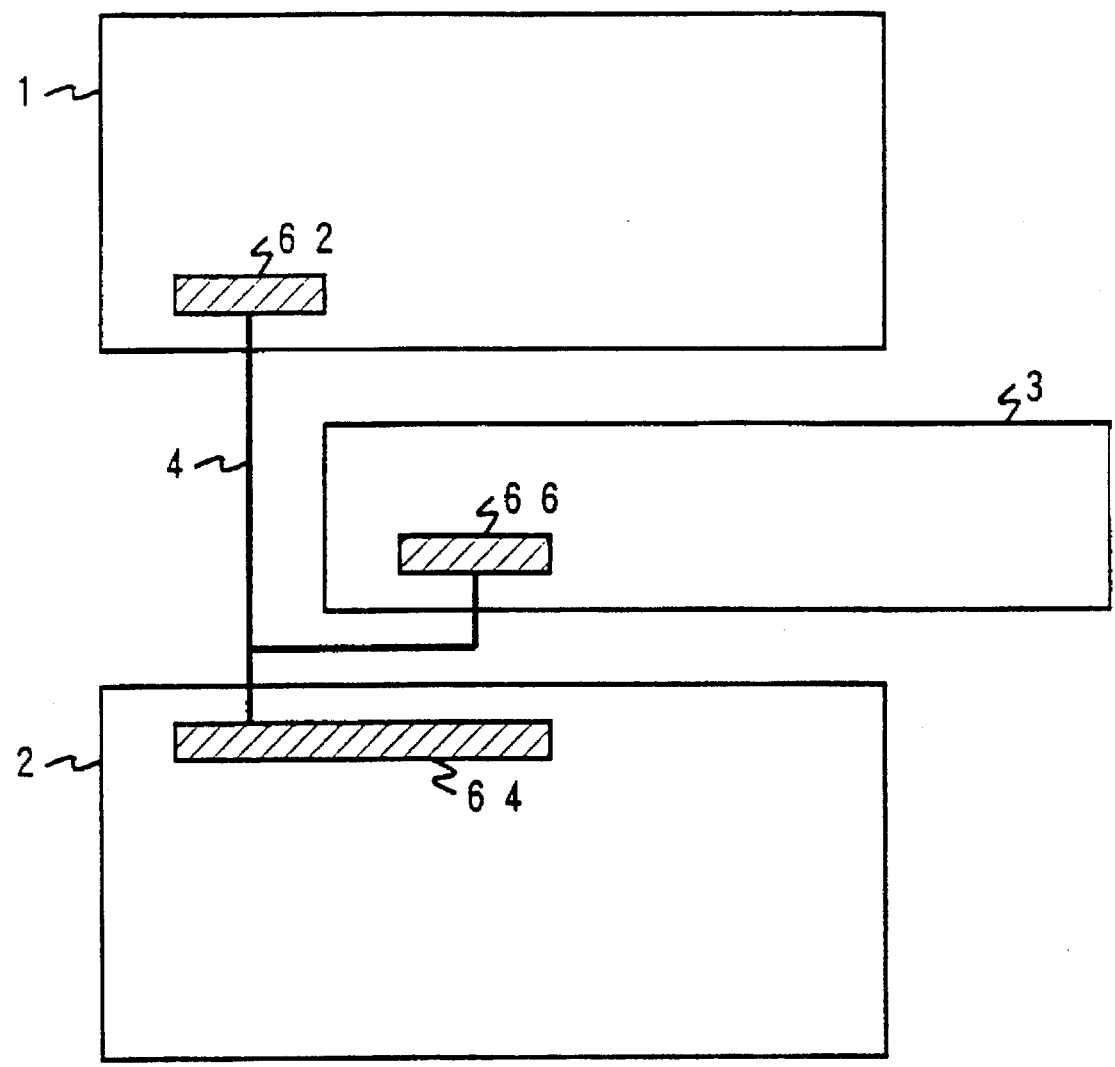
FIG. 1 is an illustration for explaining a construction of an entire copying system in which an image synthesizing system according to the present invention is used.

A description will now be given of an a copying system in which an embodiment of an image synthesizing system according to the present invention is used. FIG. 1 is a block diagram showing a system construction of the copying system in which the embodiment of the image synthesizing system according to the present invention is used. As shown in FIG. 1, the copying system comprises an image inputting unit 1, an image outputting unit 2 and a controlling unit 3. The image inputting unit 1, the image outputting unit 2 and the controlling unit 3 are interconnected via a transmission path 4. The image inputting unit 1 comprises image scanning means for scanning an original sheet and controlling and communicating means 62 so that image data generated by the image scanning means can be transmitted from the image inputting unit 1 to the image outputting unit 2 via the controlling and communicating means 62. The image outputting unit 2 comprises image forming means for forming an output image onto a recording sheet and controlling the communicating means 64 so that the image data can be received via the transmission path 4 and the controlling and communicating means 64. The controlling unit 3 comprises operating means used for inputting various operating commands and controlling and communicating means 66 so that the operating commands can be sent to the image inputting unit 1 and image outputting unit 2 via the transmission path 4. A copying operation is initiated by sending a copy command to the image outputting unit 2, and the image data is directly transferred from the image inputting unit 1 to the image outputting unit 2 after the copying operation has been initiated. The transmission path 4 is a conventional type used in a SCSI system, and thus other data processing units such as personal computers or peripheral devices may be connected to the transmission path 4 to communicate with each other.

Figure 2A:
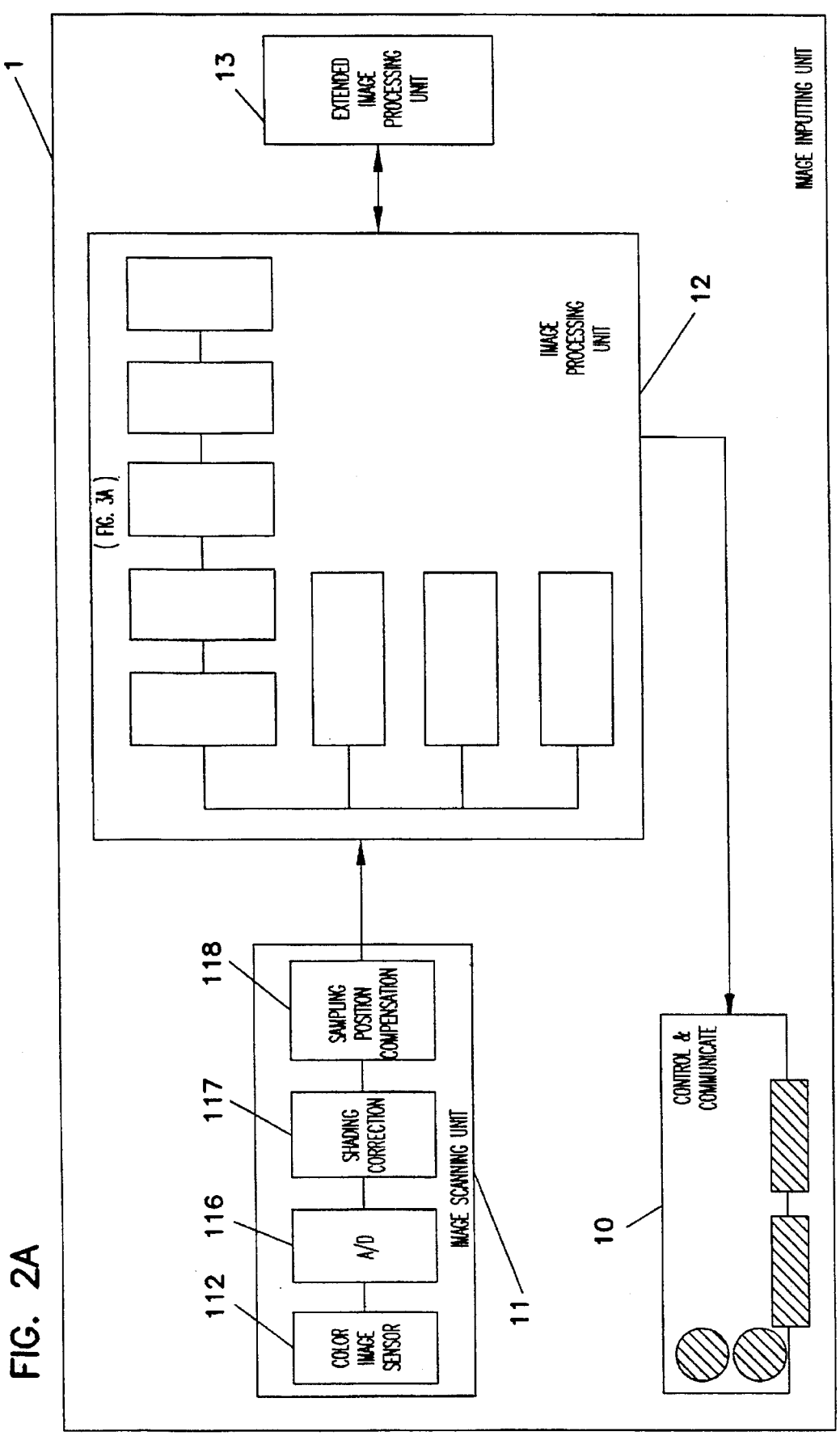
FIG. 2A is a block diagram of an image inputting unit of FIG. 1.
Figure 2B:
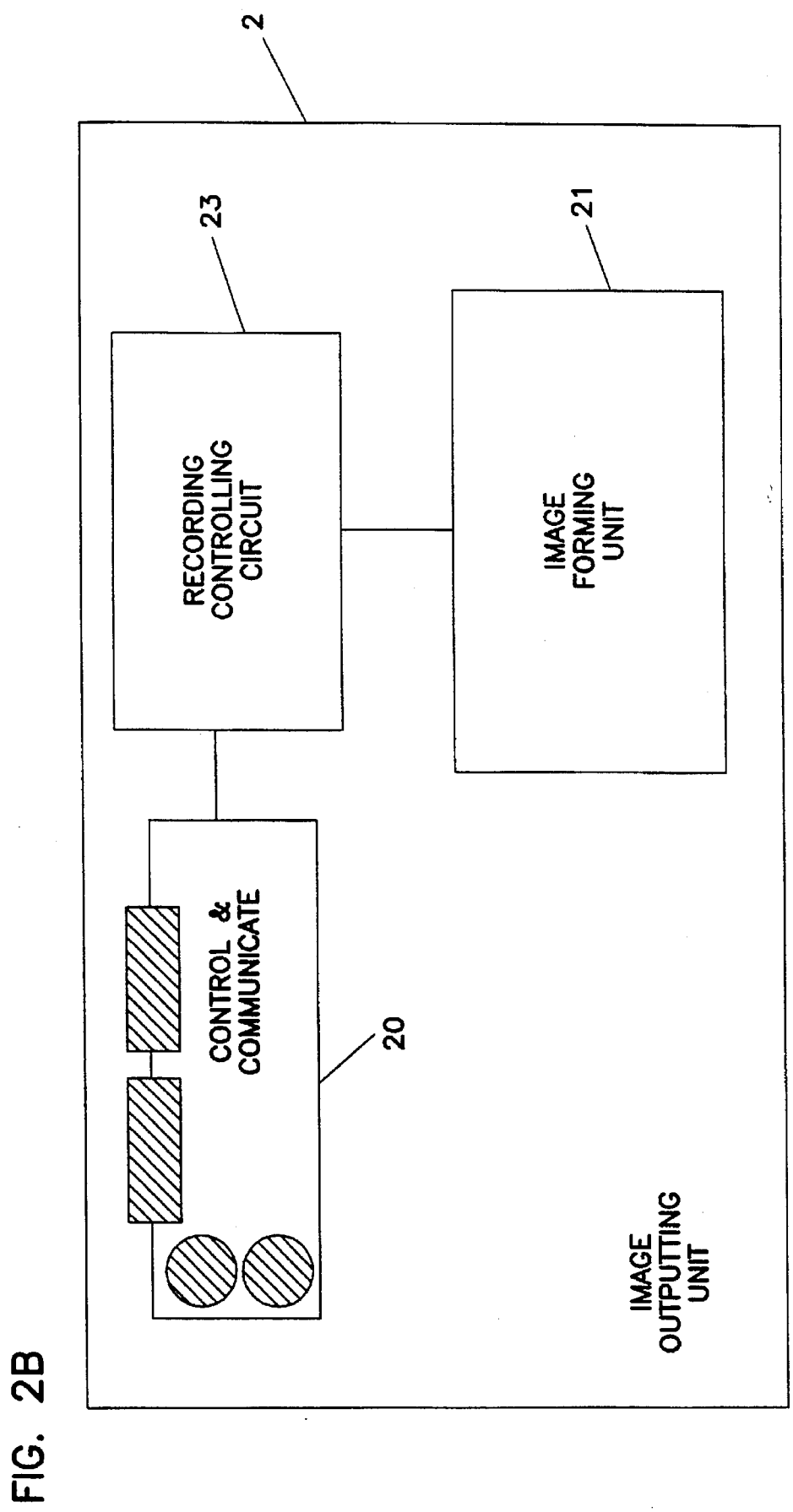
FIG. 2B is a block diagram of the image outputting unit of FIG. 1.
Figure 2C:
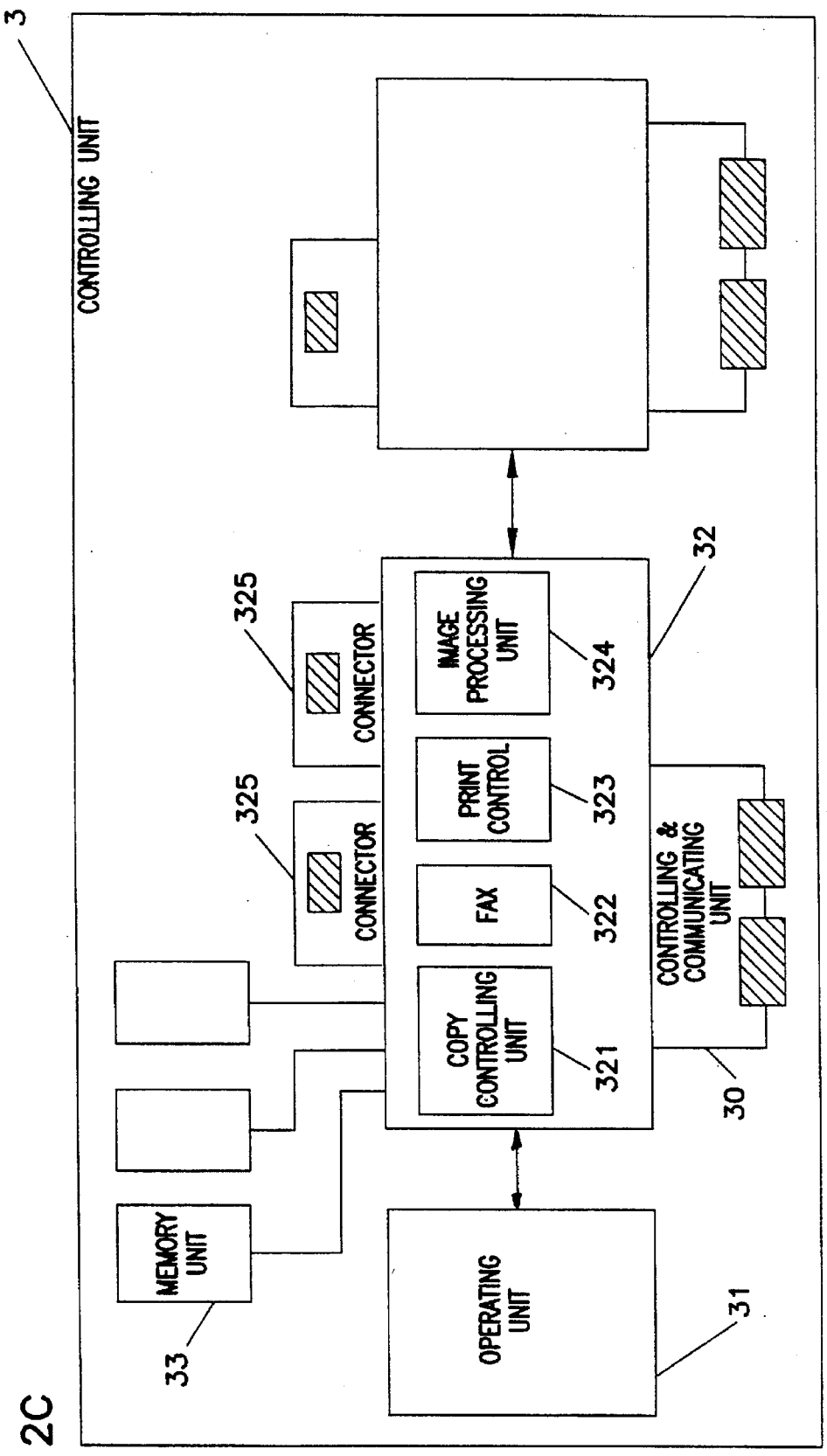
FIG. 2C is a block diagram of the controlling unit of FIG. 1.
Figure 3A:
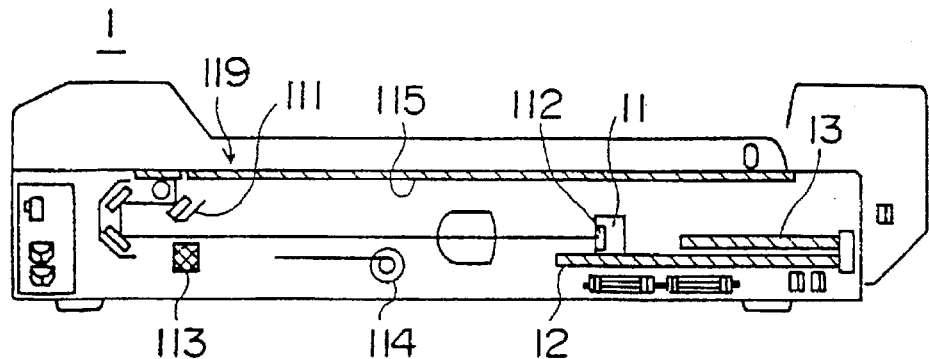
FIG. 3A is a view showing a structure of the inputting unit.
Figure 3B:
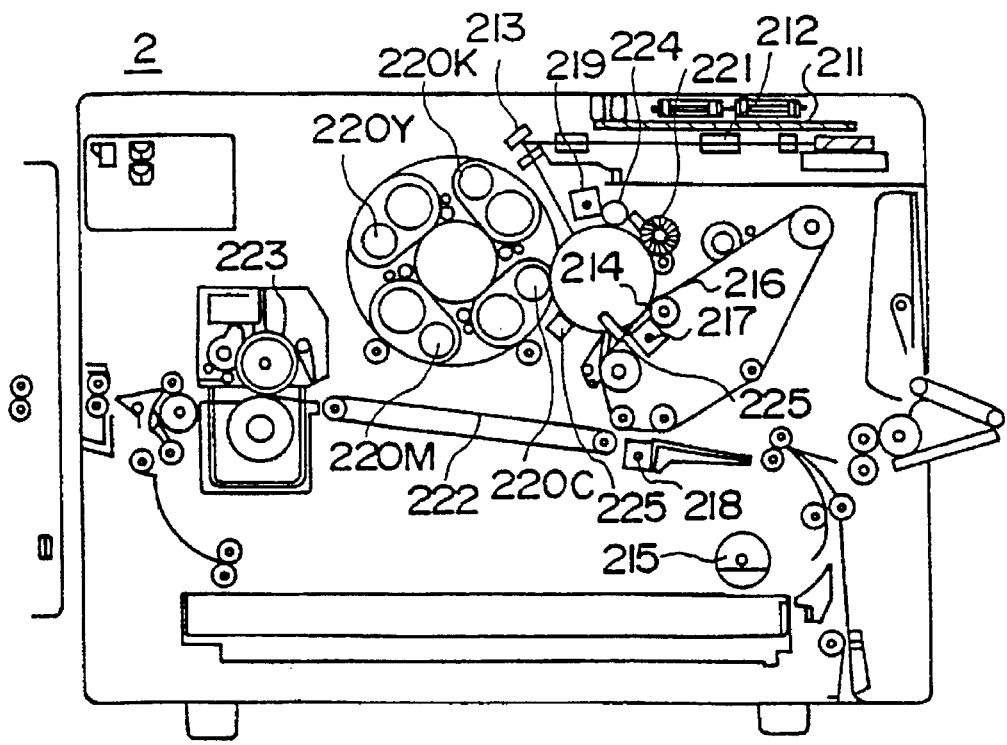
FIG. 3B is a view showing a structure of the outputting unit.
Figure 3C:
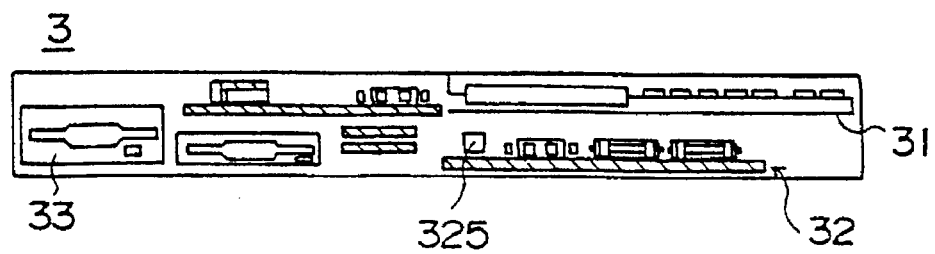
FIG. 3C is a view showing a structure of the controlling unit.

A description will now be given, with reference to FIGS. 2A through 3C, of structures of the units 1, 2 and 3. FIG. 2A is a block diagram of the image inputting unit 1; FIG. 2B is a block diagram of the image outputting unit 2; FIG. 2C is a block diagram of the controlling unit 3. FIG. 3A is a view showing a brief structure of the inputting unit 1; FIG. 3B is a view showing a brief structure of the outputting unit 2; FIG. 3C is a view showing a brief structure of the controlling unit 3.

The image inputting unit 1 comprises, as shown in FIG. 2A, an image scanning unit 11, a basic image processing unit 12 and an extended image processing unit 13. The image inputting unit 1 further comprises a controlling and communicating unit 10, which corresponds to the controlling and communicating means 62, for sending the image data to the transmission path 4. The image scanning unit 11 comprises a color image sensor device 112, an A/D converter 116, a shading correction circuit 117 and a sampling position compensating circuit 118.

As shown in FIG. 3A, the image inputting unit 1 comprises a carriage 111, a carriage home sensor 113, a stepping motor 114 and a platen 115. The original sheet is placed on the platen 115, and a scanner carried by the carriage 111 scans the original sheet. The carriage is moved along a secondary scanning direction by the stepping motor 114. Before a scanning operation starts, the carriage is positioned directly above the carriage home sensor 113. When a scanning operation is started, the carriage 111 is moved to the right in the figure. When the carriage reaches a position just out of a detection range of the carriage home sensor 113, position data of the carriage 111 is stored as reference position data.

The controlling and communicating unit 10 calculates a time period to be taken to reach to a front end 119 of the original sheet and determines an appropriate pulse train to be supplied to the stepping motor 114 in accordance with an optimum acceleration scheme.

After the carriage 111 has passed a reference point, the color image sensor device 112 starts to scan a main scan line of each color at 16 pixels to 1 mm. The color image sensor device 112 scans first a reference white plate, and background data obtained by scanning the reference white plate is converted into 8-bit digital data by the A/D converter 116. The background data is then supplied to the shading correction circuit 117. Data scanned thereafter is corrected in accordance with the background data stored in the shading correction circuit 117.

After a scanning point has reached the front end 119 of the original sheet, an analog voltage signal corresponding to a light of each color component red (R), green (G) and blue (B), reflected by the original sheet is output from the color image sensor device 112. The signal is converted by the A/D converter 116 into an 8-bit digital quantization code signal (i.e having 256 gradation) and supplied to the basic image processing unit 12.

After an entire surface of the original sheet has been scanned and the scanning point has reached an opposite end of the original sheet, a rotating direction of the stepping motor 114 is reversed to return the carriage to a home position.

Figure 4:
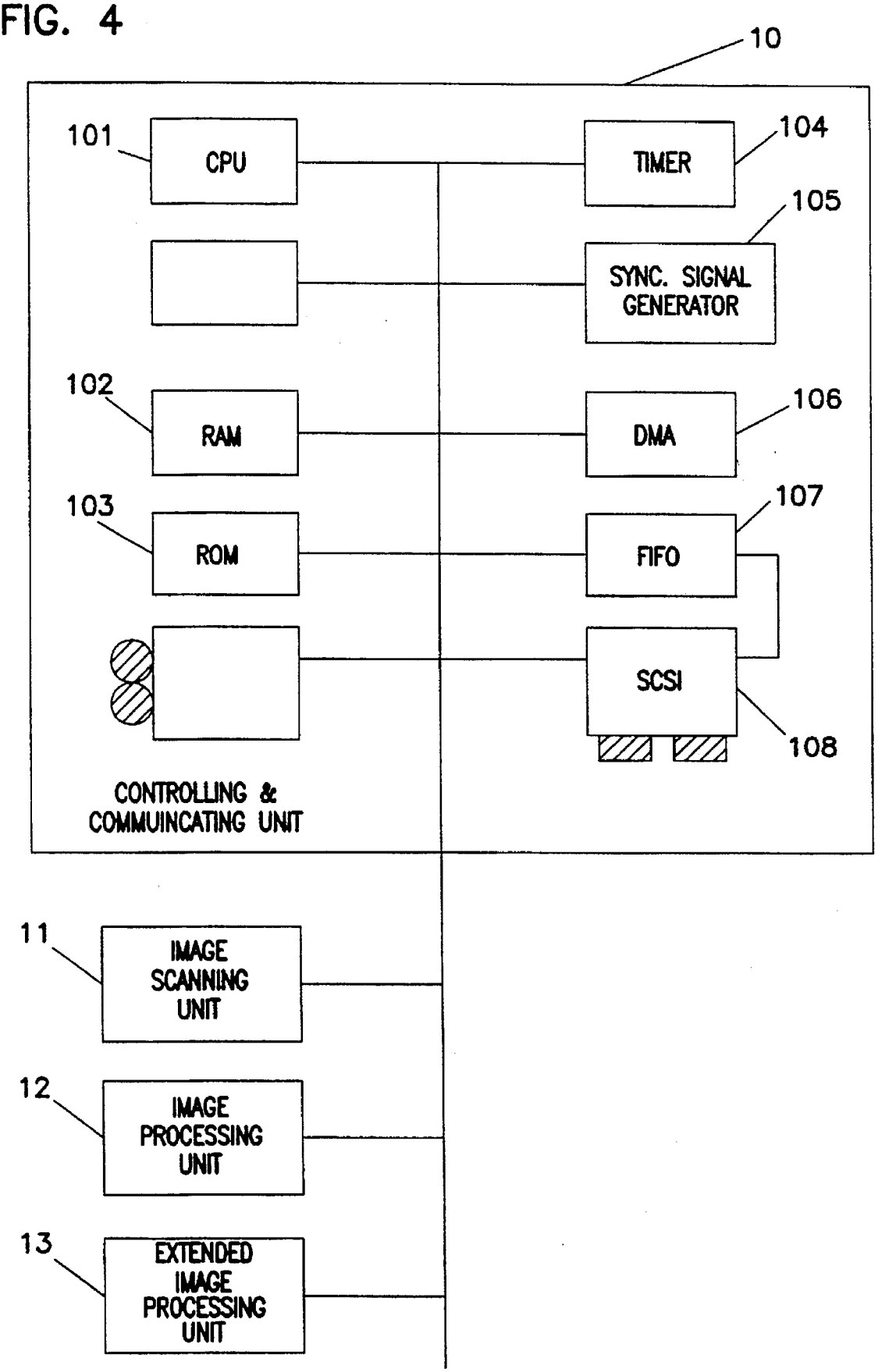
FIG. 4 is a block diagram showing a structure of a controlling and communicating unit shown in FIG. 2A.

FIG. 4 is a block diagram showing a structure of the controlling and communicating unit 10. As shown in FIG. 4, the controlling and communicating unit 10 comprises a micro processor 101, a RAM 102, a ROM 103, a timer counter 104, a synchronization signal generator 105, a direct memory access (DMA) controller 106, a first-in first-out (FIFO) buffer 107 and SCSI controller 108. The controlling and communicating unit 10 communicates with the controlling unit 3 and the image outputting unit 2 in accordance with a predetermined protocol, and controls the image scanning operation in accordance with the commands received from the controlling unit 3. The image data obtained by scanning the original sheet is transferred to the image outputting unit 2 via the transmission path 4.

In a color copy mode, since the outputting unit 2 uses a method in which four color images, that is C, M, Y, K, are sequentially formed, four scanning operations are needed for a single original sheet. Accordingly, the image inputting unit 1 sends image data of a single color each scanning operation.

A description will now be given of the image outputting unit 2. As shown in FIG. 2B, the image outputting unit 2 comprises a controlling and communicating unit 20, an image forming unit 21 and a recording controlling circuit 23. The controlling and communicating unit 20, which corresponds to the controlling and communicating means 64, has the same hardware construction as the controlling and communicating unit 10 of the image inputting unit 1.

The controlling and communicating unit 20 communicates with the controlling unit 3 and the image inputting unit 1, and receives the image data transferred from the image inputting unit 1. The image data is then supplied to the recording controlling circuit 23. The controlling and communicating unit 20 controls an entire operation of the outputting unit 2.

As shown in FIG. 3B, the image outputting unit 2 comprises a laser diode 211, an fθ lens 212, a mirror 213, a photosensitive drum 214, a paper supply roller 215, an intermediate transfer belt 216, a primary transfer corotron 217, a secondary transfer corotron 218, a charge corotron 219, a cleaner 221, a conveyor belt 222, a fixing roller 223, a driving motor 224 and an image position detector 225. Further, the image outputting unit 2 comprises developing units for cyan, magenta, yellow and black, respectively indicated by notations 220C, 220M, 220Y and 220K.

The image outputting unit 2 forms a full color image in accordance with the image data of each color C, M, Y, and K supplied via the controlling and communicating unit 20. When the an image forming operation is started, the photosensitive drum 214 rotates counterclockwise. A cyan (C) latent image is formed on the photosensitive drum and then a C toner image is developed. Similarly, magenta (M), yellow (Y) and black (K) toner images are developed sequentially. These toner images are finally transferred onto the intermediate transfer belt 216, which rotates in synchronization with the photosensitive drum 214, using a corona transfer technique. The image forming operation of each color image is performed by a known technique using raster exposure. It should be noted that the M toner image, the Y toner image and the K toner image must be superimposed exactly on the C toner image on the intermediate transfer belt 216. This is achieved by using a timing signal generated by detecting a registration mark. The registration mark is formed a predetermined distance ahead of the C toner image when the C toner image is formed.

A description will now be given of a controlling unit 3. As shown in FIG. 2C, the controlling unit 3 comprises a controlling and communicating unit 30, an operating unit 31, a system controlling unit 32 and a memory unit 33. The system controlling unit 32 comprises a copy controlling unit 321, a facsimile communication unit 322, a print controlling unit 323, an image processing unit 324 and a connector 325. The controlling and communicating unit 30 has the same hardware construction as the controlling and communicating unit 10 of the image inputting unit 1.

The controlling unit 3 is interconnected with other subsystems, such as the image inputting unit 1 and the image outputting unit 2, via the transmission path 4, and controls an entire operation of a copying system. Instructions made by an operator are input via the operating unit 31 having an operational keyboard and a display unit. Status of the copying operation and messages for the operator can be displayed on the display unit of the operating unit 31.

In the above-mentioned copying system in which the image data is transferred via the commonly used conventional transmission path, it is important how the image forming operation is performed in synchronization with the image scanning operation performed by a different unit. This is more important, in particular, in a case where a color copying operation is performed because additional synchronization has to be achieved for each color component image.

Figure 5:
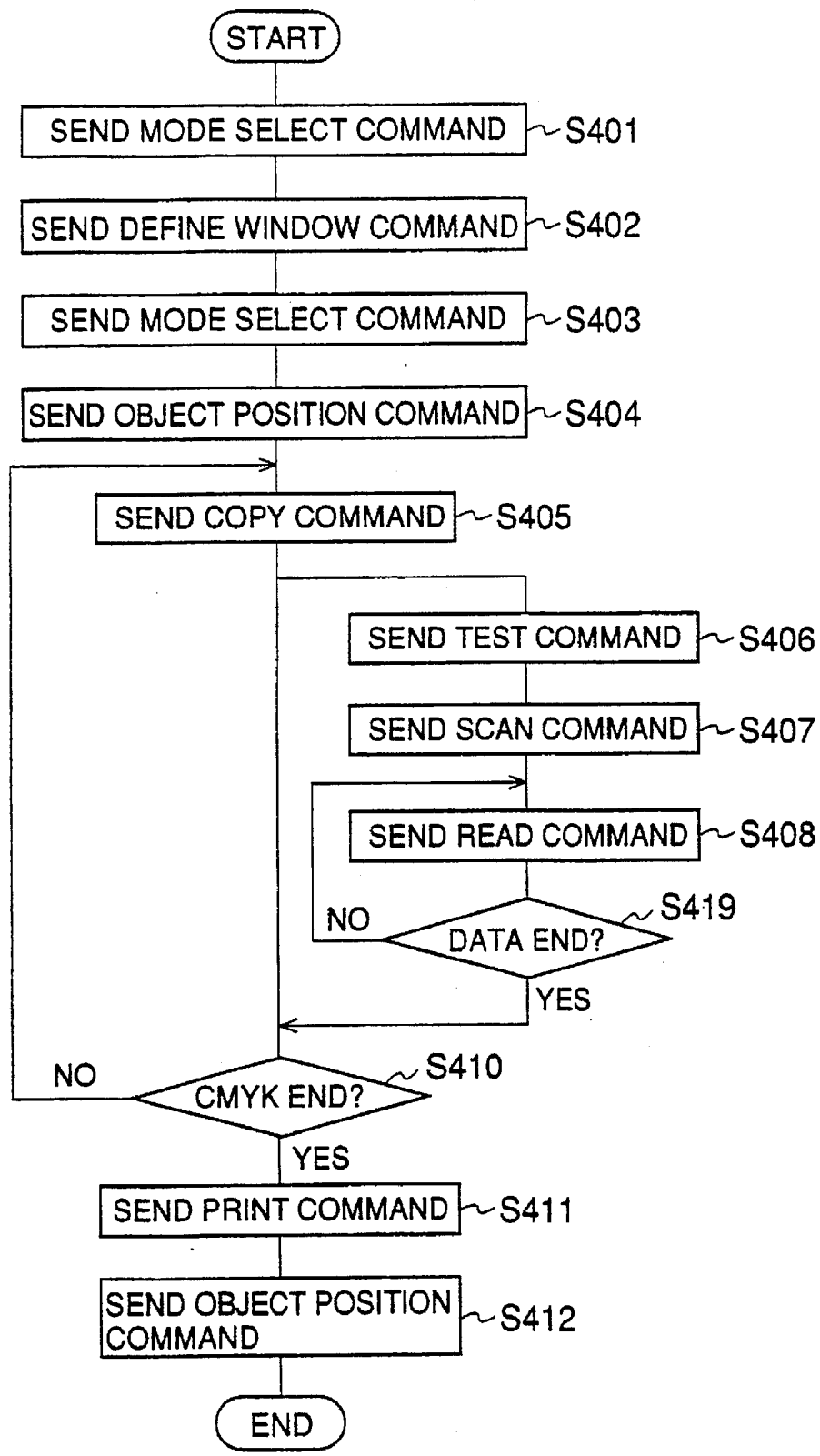
FIG. 5 is a flow chart of a communication procedure of a copying system in which the image synthesizing system according to the present invention is used.
Figure 6:
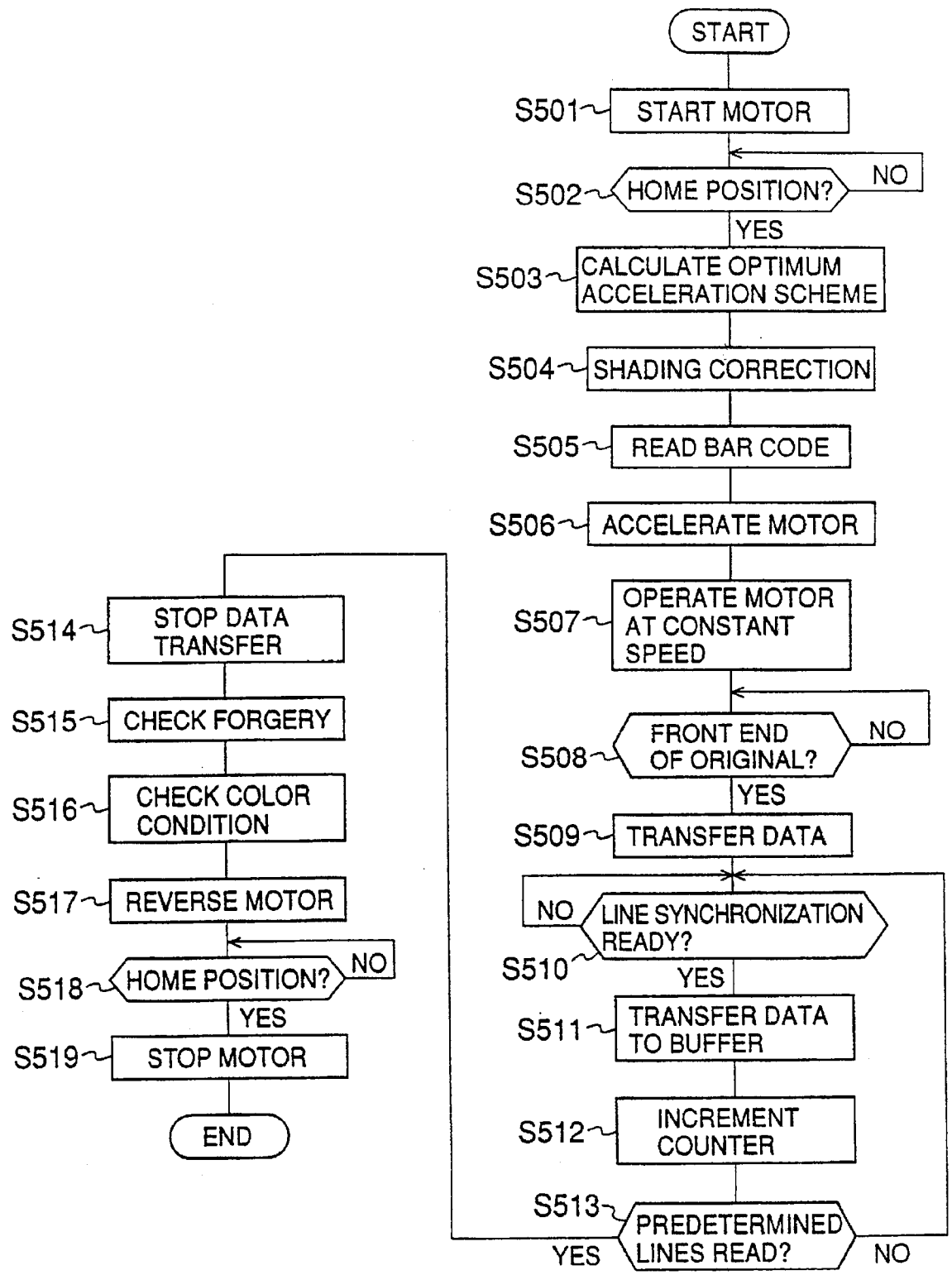
FIG. 6 is a flow chart of an operation preformed in the image inputting unit of FIG. 1.
Figure 7:
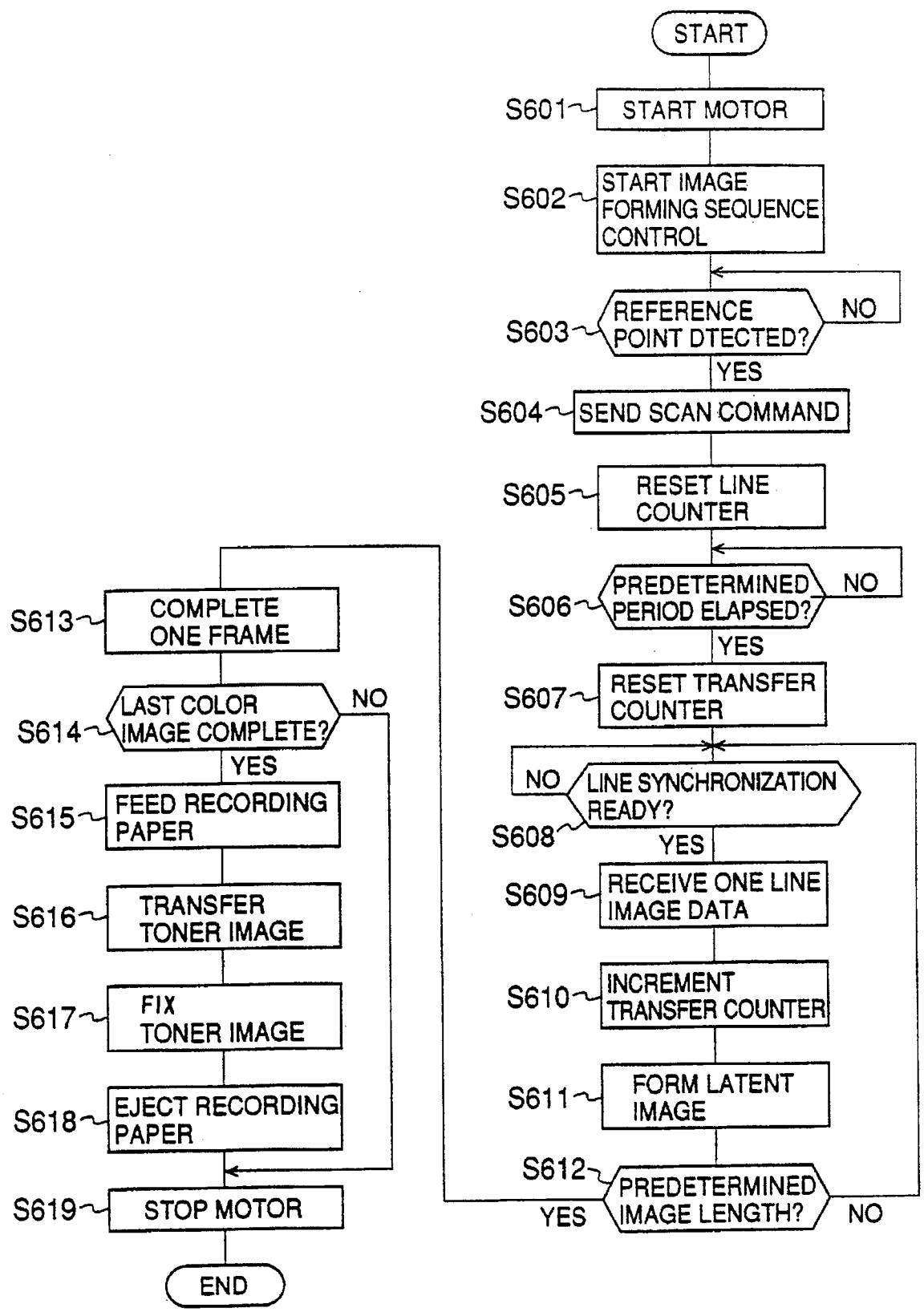
FIG. 7 is a flow chart of an operation performed in the image outputting unit of FIG. 1.

A description will now be given of the copying operation performed by the above-mentioned copying system. FIG. 5 is a flow chart of a communication procedure. FIG. 6 is a flow chart of an operation performed in the image inputting unit 1. FIG. 7 is a flow chart of an operation performed in the image outputting unit 2.

The above-mentioned copying system uses the SCSI system. In the SCSI system, a subsystem (device), which has a SCSI interface and connected to a SCSI bus (common transmission path), functions as either an initiator or a target. The initiator is a device which has a priority for using the SCSI bus and requests other devices (targets) to perform an operation. The target is an SCSI device which performs the operation requested by the initiator. Generally, a host computer acts as the initiator.

In the above-mentioned copying system, as initial conditions, the controlling unit 3 is set as the initiator, and the image inputting unit 1 and the image outputting unit 2 are set as the targets. An operation described below starts at a time when a copy key of the operating unit 31 of the controlling unit (hereinafter called SCU) 3 is pressed under a condition where each unit is set as above and set in an information transfer phase.

In FIG. 5, when the copying operation is started by an operator pressing the copy key, the SCU 3 sends, in step 401 (hereinafter step is abbreviated S), a mode select command to the image inputting unit (hereinafter called SCN) 1 via the transmission path 4. By the mode select command, selections are made for functions of the SCN 1. The functions of the SCN 1 include whether or not an auto document feeder (ADF) is to be used, whether an intensity of the image should be increased or decreased, whether a resolution of scanning is photograph-level, or the like. In the copying operation shown in FIG. 6, the ADF is selected.

In S402, SCU 3 sends a define window command to SCN 1 to set an area to be scanned. The SCU 3 then sends, in S403, a mode select command to the image outputting unit (hereinafter called PRN) 2 to set necessary conditions including selection of a paper supplying tray (paper size) and selection of bins for ejected papers. Accordingly, the SCU 3 obtains information for the paper supplying tray from the operator or from SCN 1, and obtains information for the bins for the ejected papers from the operator.

In S404, SCU 3 sends an object position command to SCN 1 so that an original sheet set in the ADF (not shown in the figure) is set on the platen 115. The SCU 3 then sends, in S405, a copy command to PRN 2 so that recording paper in the paper supplying tray 226 is fed to a register. After the copy command is sent, PRN 2 is set as the initiator with respect to SCN 1. That is, PRN 2 is the target with respect to SCU 3 while being the initiator with respect to SCN 1.

Because only SCU 3 is set as the initiator in the above operation from S401 to S405, SCN 1 and PRN 2 can act as subsystems of other systems. Accordingly, an operator unit for inputting the various commands is provided only to SCU 3. However, once the initial conditions are set as mentioned above, PRN can be set as the initiator in order to achieve a direct communication between PRN 2 and SCN 1 so that the scanning operation performed by SCN 1 and the image forming operation performed by PRN 2 can be simultaneously performed.

PRN 2 as the initiator sends, in S406, a test command so as to check whether or not SCN 1 is set in a condition where scanning can be started. That is, it is determined whether or not the original sheet is set to a predetermined position, and the carriage 111 is in the home position directly above the carriage home sensor 113.

When PRN 2 receives, in S406, a response that SCN 1 is ready to start the scanning operation, the motor 224 of the PRN 2 is rotated to start the image forming operation. This step is described as S601 in the flow chart of FIG. 7. When the image forming operation has started, an image forming sequence control is started in S602, and it is determined, in S603, whether or not the reference point described before is detected. The reference point corresponds to the registration mark to be detected by the image position detector 225. Although, as previously described, only the color component images other than the C toner image need to be formed in synchronization with the registration mark formed on the intermediate transfer belt 216, the following operation is described for a case where a fixed reference point is formed on the belt 216. In this case, the image scanning operations for all color component images are performed in synchronization with the fixed reference point so that all color images are exactly superimposed in the corresponding image.

When the reference point is detected, PRN 2 sends, in S604 (S407), a scan command to SCN 1. SCN 1 then starts to rotate, in S501 of FIG. 6, the stepping motor 114 so as to move the carriage 111. In this manner, the movement of the carriage 111 is synchronized with the movement of the intermediate transfer belt of PRN 2. The carriage 111 then moves to the scanning start position, as previously mentioned, by following S502 through S506.

After the carriage 111 reaches the scanning start position, the carriage 111 is moved, in S507, at a constant speed, and it is determined, in S508, whether or not the carriage 111 has reached the front end 119 of the original sheet. If it is determined that the carriage 111 has reached the front end 119, and when the data transmission is allowed in S509, scanning of a first line is started after a primary scanning counter is set to 0 in S510.

It should be noted that although a scanning speed of SCN 1 is set to the same as that of PRN 2, the scanning speed of SCN 1 may be slightly faster than that of PRN 2. Additionally, a secondary scanning speed is dependent of a primary scanning speed. That is, a count number of primary scanning lines corresponds to a number of pulses supplied to the stepping motor 114 which provide movement of the carriage 111 in the secondary scanning direction. The carriage moves one line when a predetermined number of pulses are supplied to the stepping motor 114. It should be noted that circuits related to synchronization are included in the synchronization generator 105. Similarly, the secondary scanning speed of PRN 2 is dependent on the primary scanning speed of PRN 2. Additionally, moving speed of the intermediate transfer belt 216 of PRN 2 is also set in response to the scanning speed of PRN 2.

In S510, it is determined whether or not line synchronization is completed. If the calculated number of pulses are supplied in a predetermined period, as previously described, to the stepping motor 114, the carriage 111 moves to the predetermined position at the predetermined time, and thus the line synchronization is completed. In S511, transfer of the scanned image data to the FIFO buffer 107 is started. As previously mentioned, the scanned image data is supplied to the FIFO buffer 107 via the A/D converter 116 and the basic image processing unit 12. That is, the analog signal obtained by scanning the original sheet is sampled at a predetermined sampling frequency, and converted into the 8-bit digital data. The digital data is then processed by the basic processing unit 12, and two most significant bits are, for example, supplied to the FIFO buffer 107 as data to be transferred to PRN 2.

In the present copying system, only 2-bit digital data corresponding to 4 gradation levels is transferred to PRN 2 since the 8-bit digital data corresponding to the 256 gradation levels is not necessary. By setting a number of gradation levels to 4, a transferring period can be reduced so as to be appropriate to the conventional SCSI bus, and thus a condition is realized in which simultaneous operation of SCN 1 and PRN 2 can be performed.

Referring now to the flow chart of FIG. 7, after PRN 2 sends the scan command to SCN 1, the line counter is reset in S605. It is determined, in S606, whether or not the predetermined period has elapsed. If it is determined that the predetermined period has elapsed, a transfer counter is reset, in S607, and then it is determined, in S608, whether the line synchronization is completed in the same way performed in SCN 1. PRN 2 then sends, in S408 of FIG. 5, a read command to SCN 1. A time period from sending the scan command to sending the read command to SCN 1 corresponds to a time period from the time when the first line is written on the photosensitive drum to the time when the first line reaches the predetermined position of the intermediate transfer belt 216.

By the time SCN 1 receives the read command, image data corresponding to a few lines has been already stored in the FIFO buffer 107. Even if the scanning speed of SCN 1 is designed to be the same as the scanning speed of the PRN 2, there is a possibility that the scanning speed of SCN 1 becomes slightly slower or faster than the scanning speed of PRN 2 due to allowances in each scanning speed. When the scanning speed of PRN 2 becomes slower than the scanning speed of SCN 1, the FIFO buffer 107 should have a capacity to store the image data corresponding to $\alpha$ lines. When the scanning speed of SCN 1 becomes slower than the scanning speed of PRN 2, the FIFO buffer 107 should store the image data corresponding to $\beta$ lines before the read command is received. Accordingly, the capacity of the FIFO buffer 107 should be $\alpha+\beta$ lines. In the present embodiment, a required capacity of the FIFO buffer 107 is 2 to 3 lines. The scanning speed of SCN 1 may be set at a predetermined speed slower than the scanning speed of PRN 2 so that maximum allowance of the scanning speed of SCN 1 never exceeds the scanning speed of PRN 2.

The read command from PRN 2 to SCN 1 is sent every line or every few lines. Data transmission to the FIFO buffer 107 in SCN 1 is performed with line synchronization regardless of the read command. That is, the primary scanning counter is incremented, in S512, and it is determined, in S513, whether a predetermined number of lines have been read. If the predetermined number have not been read, the routine returns to S510. If the primary scanning counter is 0, the carriage 111 has proceeded one line. Accordingly, the scanning for one line is performed and the scanned data is transferred to the FIFO buffer 107. If it is determined, in S513, that the predetermined number of lines have been read, the data transfer is stopped in S514. Other data processing operations, such as checking for forgery and color conditions, are then applied to the image data, in S515 and S516, and then, in S517, the rotation of the stepping motor 114 is reversed so that the carriage returns to the home position. After the stepping motor 114 has returned to the home position, the stepping motor 114 is stopped, in S519, and then the routine ends.

Referring now to FIG. 7, after PRN 2 has received, in S609, one line of image data in the buffer thereof, the transfer counter is incremented in S610. In S611, the recording controlling circuit 23 reads out image data in the buffer so as to form a latent image corresponding to one line on the photosensitive drum. In S612, it is determined whether or not the value of the line counter is a predetermined number. If the value has not reached the predetermined number determined by a length of the original image, the routine returns to S608 so as to send the read command to SCN 1. It should be noted that although in the present embodiment the read command is sent at every line, the read command may be sent at every few lines. As mentioned above, transferring of image data corresponding to the predetermined number of lines is completed (refer to S409 of FIG. 6), and forming of a latent image corresponding to one frame (one component color) is completed in S613. The development of the latent image is completed a predetermined time later.

On the other hand, before formation of the latent image of one frame is completed, a leading edge (the first line) reaches the predetermined position of the intermediate transfer belt, and the toner image is transferred onto the intermediate transfer belt.

The above-mentioned image forming operation is repeated for every color component image so that all the color toner images are transferred onto the intermediate transfer belt in a superimposed relationship.

When it is determined, in S614, that transfer of a last color image has been completed, the recording paper is fed, in S615, and the toner image on the intermediate transfer belt is transferred onto the recording paper in S616. The toner image is then fixed, in S617, and the recording paper is ejected in S618. The motor 224 is then stopped, and the printing operation ends. The steps from S614 to S619 correspond to the steps from S410 to S412 of FIG. 5.

The above description was given for an entire copying system in which an embodiment of an image synthesizing system according to the present invention is used. A description will now be given of an essential part of the present invention.

The description of the present invention is given on the assumption that a monochromatic image is superimposed on a color image formed by means of the above-mentioned copying system. One typical example is a case where the color image is a photograph and a description of the photograph is added in a blank under the photograph.

In the above-mentioned copying system, when the transfer of the last color component image to the intermediate transfer belt 216 is completed, the image transferred to the intermediate transfer belt 216 is automatically transferred to the recording paper, and then the recording paper is ejected from the image outputting unit 2. In a case where the formed image is a monochromatic image, the transfer to the recording paper is performed immediately after a single transferring operation to the intermediate transfer belt 216 is completed.

However, according to the present invention, the transfer of the image on the intermediate transfer belt 216 to the recording paper is not performed until an ejection command is supplied so that another image is transferred onto the intermediate transfer belt 216. Accordingly, the other image can be superimposed on the image already formed on the intermediate transfer belt 216. A timing of supplying the ejection command is determined by information input from the operating unit 31 of the controlling unit 3, and the information is supplied to the controlling and communicating unit 20 of the image outputting unit 2.

Figure 8:
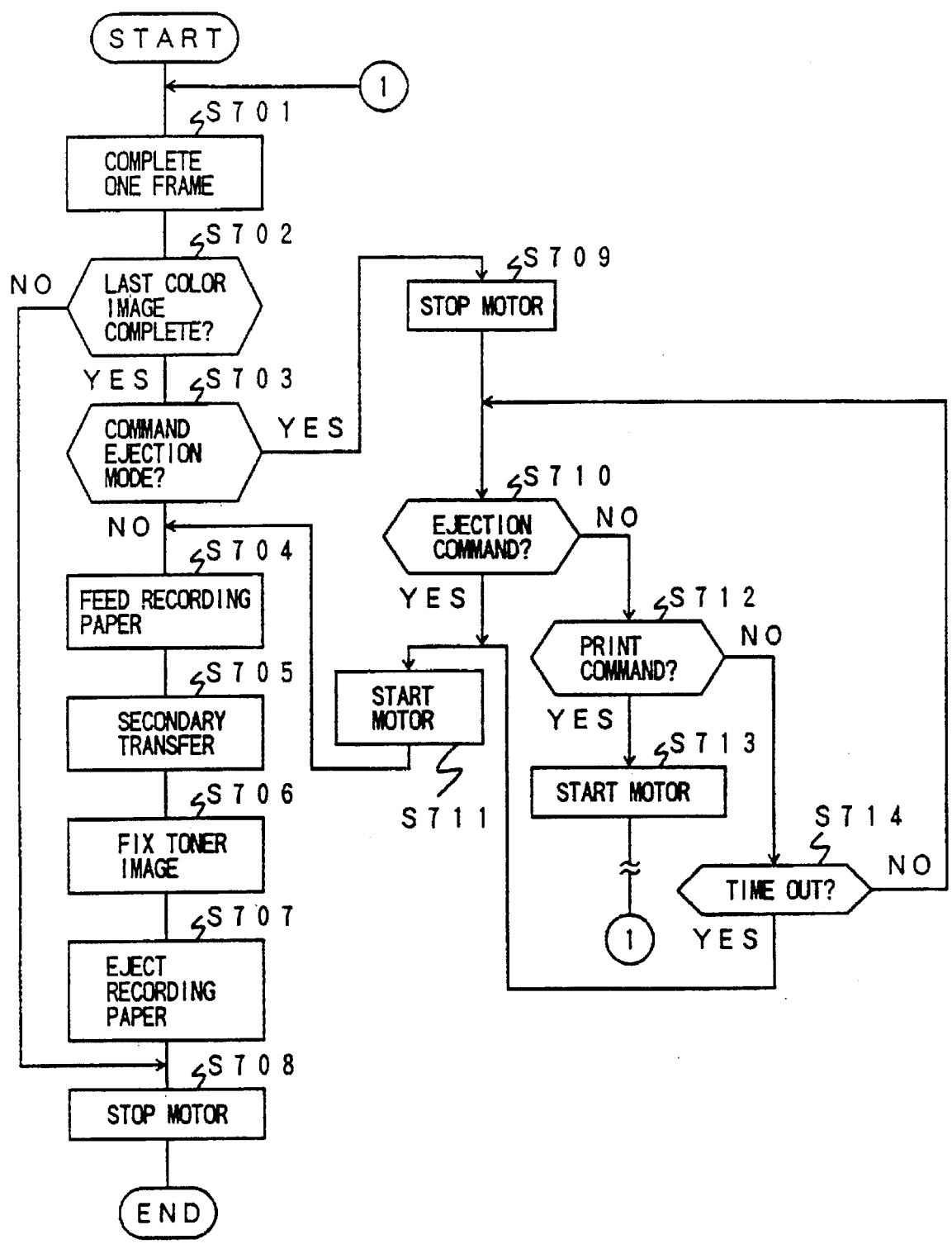
FIG. 8 is a flow chart of an operation according to the present invention performed in the image forming unit shown in FIG. 1.

FIG. 8 is a flow chart of an essential part of an operation of the embodiment according to the present invention, the operation being performed by the image outputting unit 2. The operation shown in FIG. 8 starts from S613 of FIG. 7. That is, if a complete image (the photograph in this case) is formed, in S701, on the intermediate transfer belt 216, and it is determined, in S702, that the complete image formed most recently is the last color component image, the routine proceeds to S703. If it is determined, in S703, that the image outputting unit 2 is not set in a command ejection mode, the recording paper is immediately fed in S704 and a secondary transfer process is then performed in S705. The secondary transfer process is a process for transferring the image formed on the intermediate transfer belt 216 to the recording paper. After the secondary transfer process is completed, the transferred image on the recording paper is fixed in S706, and the recording paper is then ejected in S707. After that, the motor 224 is stopped, and the routine ends.

When it is determined, in S703, that the image outputting unit 2 is set in the command ejection mode, the routine proceeds to S709 where the motor 224 is stopped so as to wait for an input of the ejection command. In S710, it is determined whether or not the ejection command is input. If the ejection command is input, the motor 224 is started in S711, and the routine proceeds to S704 to perform the secondary transfer process.

On the other hand, if it is determined, in S710, that the ejection command is not input, the routine proceeds to S712 where it is determined whether or not a print command is input from the controlling unit 3. The print command is input by the operator through the controlling unit 3 when an additional image is desired to be superimposed on the image already formed on the intermediate transfer belt 216. If it is determined, in S712, that the print command is input, the motor 224 is started in S713, and then the routine returns to S701 so as to form the additional image, which is the description of the photograph, on the intermediate transfer belt 216. It should be noted that the operator sets an original, which corresponds to the additional image to be formed, in the image inputting unit 1.

If it is determined, in S712, that the print command is not input, the routine proceeds to S714 where it is determined whether or not time is up. If it is determined that a predetermined time has elapsed, the routine proceeds to S711 so as to perform the secondary transfer process. Otherwise, the routine returns to S710 to repeat from S710 to S714.

It should be noted that if it is determined, in S702, that the last color component image is not formed, the routine directly proceeds to S708 so as to start an image forming process for another color component image.

In the above-mentioned operation for forming the additional image on the intermediate transfer belt 216, the image scanning operation for the additional image is started, as mentioned above, in synchronization with the detection of the reference point (registration mark) provided on the intermediate transfer belt 216. Accordingly, a front edge of the additional image formed on the photosensitive drum 214 can be matched to a front edge of the image already formed on the intermediate transfer belt 216. Therefore, the additional image (description of the photograph) can be superimposed in a desired position of the image (photograph) already formed on the intermediate transfer belt 216.

As mentioned in the operation of the copying system, the image forming operation for the additional image data to be superimposed can be performed by providing a buffer memory which stores only image data corresponding to a few lines. If the image outputting unit 2 has a buffer memory having a memory capacity of one or a half page, a high accuracy of synchronization for transferring the data of the additional image may not be required. However, in such a case, a data reading timing from the buffer memory is accurately synchronized with the detection of the reference point on the intermediate transfer belt 216.

A synthesizing process of additional images can be performed repeatedly by inputting the print command in S712, and thus a desired number of images can be synthesized. The image forming process can be terminated, when the desired number of images have been transferred onto the intermediate transfer belt 216, by inputting the eject command through the controlling unit 3. It should be noted that the image transferred onto the intermediate transfer belt is automatically transferred onto the recording paper when the print command is not input for the predetermined time by the process executed in S714.

In the above-mentioned operation, the additional image to be superimposed may be a character of which image data is obtained by means of bit mapping performed by the controlling unit 3. In this case, the fact that the image data for the additional image is supplied by the controlling unit 3 is notified to the image outputting unit 2, the image outputting unit 2 sends a request signal for the additional image data to the controlling unit 3.

The additional image data to be supplied by the controlling unit 3 may be generated in the controlling unit 3 or may instead be obtained from the memory unit 33 provided in the controlling unit 3. Additionally, the additional image may be obtained from an external information processing unit via the connector provided in the controlling unit 3. Further, the additional image data may be obtained from a remote facsimile machine by providing a facsimile communication means to the controlling unit 3.

According to the above-mentioned embodiment of the image synthesizing system according to the present invention, information including such as date, time, installation site, managing personnel, model name, etc. can be added to a predetermined position of the recording paper to be output.

Figure 9:
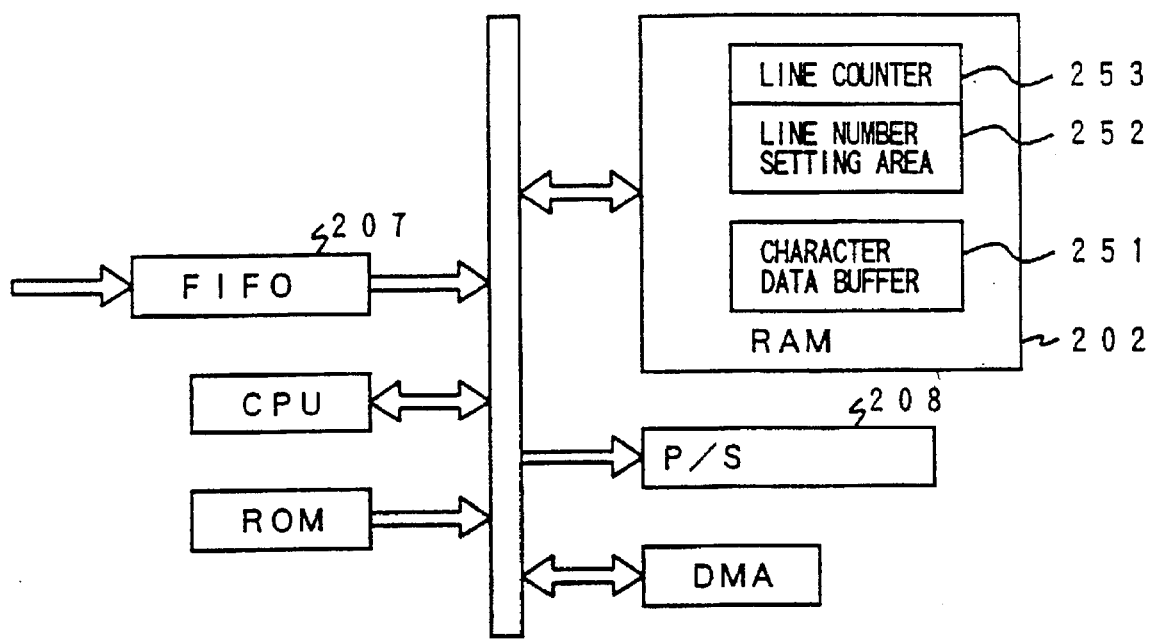
FIG. 9 is a block diagram of a part of an example of a controlling and communicating unit shown in FIG. 2B.
Figure 10:
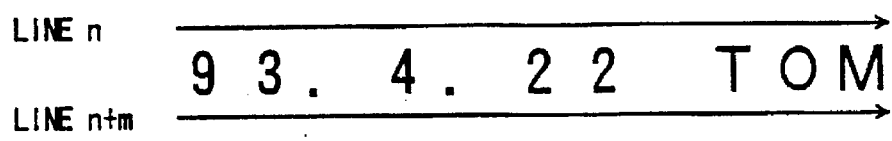
FIG. 10 is an illustration showing an example of characters added to an image formed on an intermediate transfer belt shown in FIG. 3B.

FIG. 9 is a block diagram of a part of the controlling and communicating unit 20 of the image outputting unit 2 adapted to perform an operation for adding the information. The following description will be given on the assumption that character data stored in a RAM provided in the controlling and communicating unit 30 of the controlling unit 3 is transferred to the image outputting unit 2. An example of the character data is shown in FIG. 10. It is assumed that the character data shown in FIG. 10 is added to the image already formed on the intermediate transfer belt 216 in an area corresponding to lines from an nth line to an (n+m)th line. The line number n is input from the controlling unit 3 to the controlling and communicating unit 20 of the image outputting unit 2. The line number is stored in a line number setting area 252 of the RAM 202.

The controlling and communicating unit 30 sends the bit-mapped character data shown in FIG. 10 to the image outputting unit 2 by an order indicated by arrows directed from the left to the right in the figure. The character data received by the image outputting unit 2 is supplied and stored in a character data buffer 251 in the RAM 202 via a first-in first-out (FIFO) buffer 207.

After the copying operation by the step S614 shown in FIG. 7 is completed, that is, after the complete image is formed on the intermediate transfer belt 216, the intermediate transfer belt 216 is rotated one more time to form an image corresponding to the character data stored in the character data buffer 251 on the intermediate transfer belt 216.

A count value of a line counter 253 provided in the RAM 202 is started to be incremented when the reference point on the intermediate transfer belt is detected. After that the count value is incremented in synchronization with the rotation of the intermediate transfer belt 216. The count value of the line counter 253 is compared with the line number n stored in the line number setting area 252. When the count value reaches the line number n, the character data is read out from the character data buffer 251 to form an image corresponding to the character data on the photosensitive drum 214, and eventually transfer the image formed on the photosensitive drum 214 to the intermediate transfer belt 216 so that the image corresponding to the character data stored in the character data buffer 251 is superimposed on the image already formed on the intermediate transfer belt 216 in an area starting from the nth line to the (n+m)th line.

The character data read out from the character data buffer is transferred to the image forming means of the image outputting unit 2 via a parallel/serial converter 208.

The above-mentioned embodiment according to the present invention was described on the assumption that the image data is supplied by a plurality of image information supplying sources. However, the image synthesizing system according to the present invention may be incorporated in an image forming apparatus such as a stand-alone copy machine. Such a stand-alone copy machine may be provided with a generating means for generating character data or ruled line data so as to form a character or ruled lines on the recording paper when the copying operation is performed. The above data may be input from an external apparatus via an interface provided in the copy machine.

The present invention is not limited to the specifically disclosed embodiments, and variations and modifications may be made without departing from the scope of the present invention.

What is claimed is:

1. An image duplicating system for superimposing distinct images on top of each other on an image-carrying medium, comprising:

an image generator for generating a plurality of duplicated images according to original distinct images;

an intermediate image holder located adjacent to said image generator for holding said duplicated images that are partially superimposed on top of each other, defining a superimposed image;

a controller unit connected to said image generator and said intermediate image holder for activating said image generator and controlling a first timing of transferring said duplicated images onto said intermediate image holder, said controller further controlling a second timing of simultaneously transferring said superimposed image onto the image carrying medium, and a command input unit for specifying a command ejection mode to generate said superimposed image, a print command to activate said image generator under the command ejection mode and to initiate the transfer of said duplicated image onto said intermediate image holder and an ejection command to terminate the command ejection mode for transferring of said superimposed image to the image carrying medium.

2. The image duplicating system according to claim 1 wherein said controller unit further comprises a timer for specifying a predetermined time for the command ejection mode to be effective.

3. The image duplicating system according to claim 2 wherein said controller generates a signal indicative of an absence of any of said print command for the predetermined time.

4. The image duplicating system according to claim 1 wherein said intermediate image holder is an intermediate transfer belt having a common image reference point for superimposing said duplicated images.

5. The image duplicating system according to claim 4 wherein said controller unit further comprises a sensor for detecting the common image reference point for generating a reference timing signal so as to adjusting the first timing.

6. The image duplicating system according to claim 1 wherein said image generator includes a photosensitive drum and a developer.

7. The image duplicating system according to claim 5 wherein said image generator further comprises an input interface for receiving image data as the original distinct images.

8. The image duplicating system according to claim 7 further comprising a line buffer connected to said input interface for storing image data until the reference timing signal is generated.

9. The image duplicating system according to claim 1 wherein said superimposed image includes color images and black-and-white images.

10. The image duplicating system according to claim 9 wherein said black-and-white images are alphanumeric characters containing certain predetermined information.

11. The image duplicating system according to claim 1 wherein said image generator is a scanner for generating said duplicated images and said intermediate image holder is a photosensitive drum.

12. An image duplicating system for superimposing distinct images on top of each other on an image-carrying medium, comprising:

an image generator for generating a plurality of duplicated images according to original distinct images;

an intermediate image holder located adjacent to said image generator for holding said duplicated images that are partially superimposed on top of each other, defining a superimposed image;

a controller unit connected to said image generator and said intermediate image holder for activating said image generator and controlling a first timing of transferring said duplicated images onto said intermediate image holder, said controller further controlling a second timing of simultaneously transferring said superimposed image onto the image carrying medium; and a command input unit connected to said controller unit for inputting a first input command specifying said first timing and a second input command specifying said second timing.

13. The image duplicating system according to claim 12 wherein said input command includes a command ejection mode to generate said superimposed image, a print command to activate said image generator under the command ejection mode and to initiate the transfer of said duplicated image onto said intermediate image holder and an ejection command to terminate the command ejection mode for transferring of said superimposed image to the image carrying medium.

14. The image duplicating system according to claim 13 wherein said controller unit further comprises a timer for specifying a predetermined time for the command ejection mode to be effective.

15. The image duplicating system according to claim 12 further comprising a display unit connected to said controller unit for displaying a simulated superimposed image on said intermediate image holder.

16. The image duplicating system according to claim 12 wherein said image generator is a scanner for generating said duplicated images and said intermediate image holder is a photosensitive drum.

17. The image duplicating system according to claim 12 wherein said image generator is a photosensitive drum and said intermediate image holder is an intermediate transfer belt.

18. A method of superimposing duplicated images on an image-carrying medium, comprising the steps of:

a) generating a first duplicated image according to a first original image;

b) selecting a first timing of transferring said first duplicated image onto an image holding surface;

c) generating a second duplicated image according to a second original image;

d) issuing a print command to select a second timing of transferring said second duplicated image on top of said first duplicated image on the image holding surface so as to generate a superimposed image; and e) issuing an ejection command to select a third timing of simultaneously transferring said superimposed image onto the image carrying medium.

19. The method of superimposing images according to claim 18 wherein said third timing is specified by a predetermined time.

20. The method of superimposing images according to claim 18 wherein the image holding surface is an intermediate transfer belt having a common image reference point.

21. The method of superimposing images according to claim 20 wherein said step d) further comprises an additional step of detecting the common image reference point for adjusting said second timing.

22. The method of superimposing images according to claim 18 further comprising an initial step of storing said second original image in a line buffer.

23. The method of superimposing images according to claim 18 wherein said first original image includes color images.

24. The method of superimposing images according to claim 18 wherein said second original image includes black-and-white images.

25. The method of superimposing images according to claim 24 wherein said black-and-white images are alphanumeric characters containing certain predetermined information.

26. A method of superimposing distinct images on top of each other on an image-carrying medium, comprising the steps of:

a) generating a plurality of duplicated images according to original distinct images;

b) superimposing said duplicated images that are partially overlapping on top of each other, defining a superimposed image; and c) inputting an input command specifying a timing of simultaneously transferring said superimposed image onto the image carrying medium, said input command including a command ejection mode to generate said superimposed image, a print command to generate an additional image to be superimposed and an ejection command to terminate the command election mode for transferring of said superimposed image to the image carrying medium.

27. The method of superimposing images according to claim 26 further comprising an additional step of determining whether said input command is inputted within a predetermined time.

28. The method of superimposing images according to claim 26 further comprising an additional step of displaying a simulated image of said superimposed image.

* * * * *